May 17, 1927. 1,628,755
P. A. TANNER ET AL
LUBRICATING MEANS FOR INTERNAL COMBUSTION ENGINES
Filed Feb. 12, 1925 2 Sheets-Sheet 1

INVENTOR.
Philip A Tanner.
Finn T. Ørgens.
BY
ATTORNEY.

May 17, 1927.
P. A. TANNER ET AL
1,628,755
LUBRICATING MEANS FOR INTERNAL COMBUSTION ENGINES
Filed Feb. 12, 1925     2 Sheets-Sheet 2
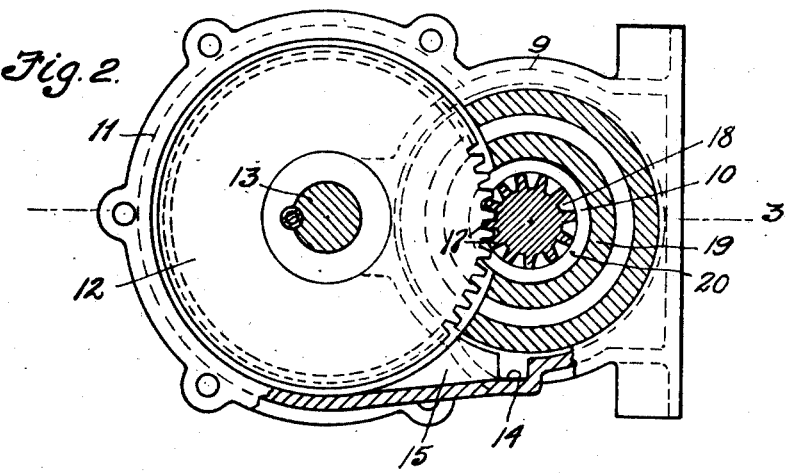
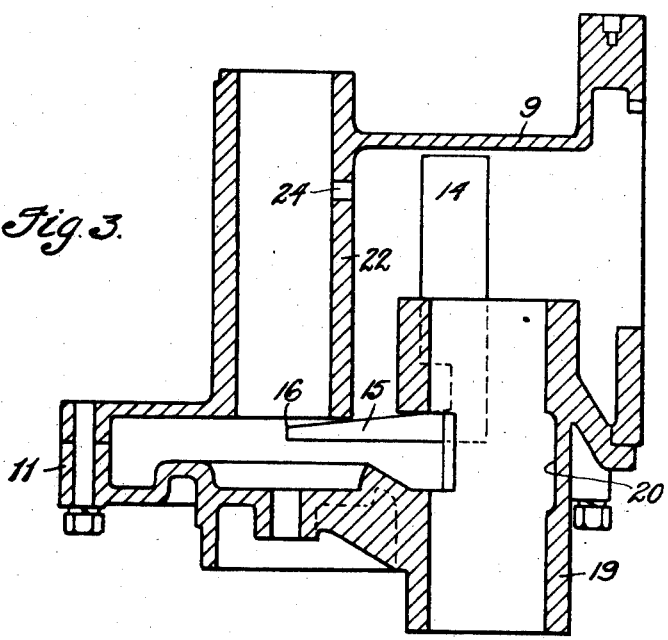
INVENTOR.
Philip A. Tanner.
Finn T. Irgens.
BY
ATTORNEY.

Patented May 17, 1927.

1,628,755

UNITED STATES PATENT OFFICE.

PHILIP A. TANNER AND FINN T. IRGENS, OF SOUTH BEND, INDIANA, ASSIGNORS TO CUSHMAN MOTOR WORKS, OF LINCOLN, NEBRASKA, A CORPORATION.

LUBRICATING MEANS FOR INTERNAL-COMBUSTION ENGINES.

Application filed February 12, 1925. Serial No. 8,845.

The invention relates to lubricating means for internal combustion engines, and has for its object to provide means whereby lubricant which collects in the crank casing of the engine will be taken up by means of a rotatable gear having meshing engagement with teeth on a crank shaft, and the lubricant taken up by the gear, distributed on the crank shaft incident to the centrifugal action during the rotation of the gear, thereby lubricating the bearings of the crank shaft.

A further object is to dispose the crank shaft teeth between spaced bearings whereby both of said bearings will be lubricated during the rotation of the gear and crank shaft. Also to extend the recesses between the teeth of the crank shaft into the ends of bearing sleeves whereby lubricant collecting pockets are formed in which pockets lubricant is collected and distributed in the bearing sleeves.

A further object is to provide in the bottom of the crank casing an oil conductor channel which terminates adjacent the under side of the oil distributing gear for conducting oil which collects in the crank casing to a position where it will be taken up by the gear during its rotation.

A further object is to provide a rotatable shaft preferably parallel with the crank shaft and on which the oil distributing gear is mounted, said shaft being rotatably mounted in a sleeve having spaced sleeves therein, thereby forming an oil chamber around the shaft and an aperture in the first mentioned sleeve adjacent the crank of the crank shaft and through which aperture oil is splashed and forced during the rotation of the crank, thereby maintaining the annular oil collecting chamber supplied with oil for lubricating the spaced bearings of the shaft.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawing:—

Figure 2 is a longitudinal sectional view taken on line 2—2 of Figure 1.

Figure 3 is a horizontal sectional view taken on line 3—3 of Figure 2, showing the casing, and the crank shaft with the lubricating gear eliminated to better show the structure.

Figure 1:
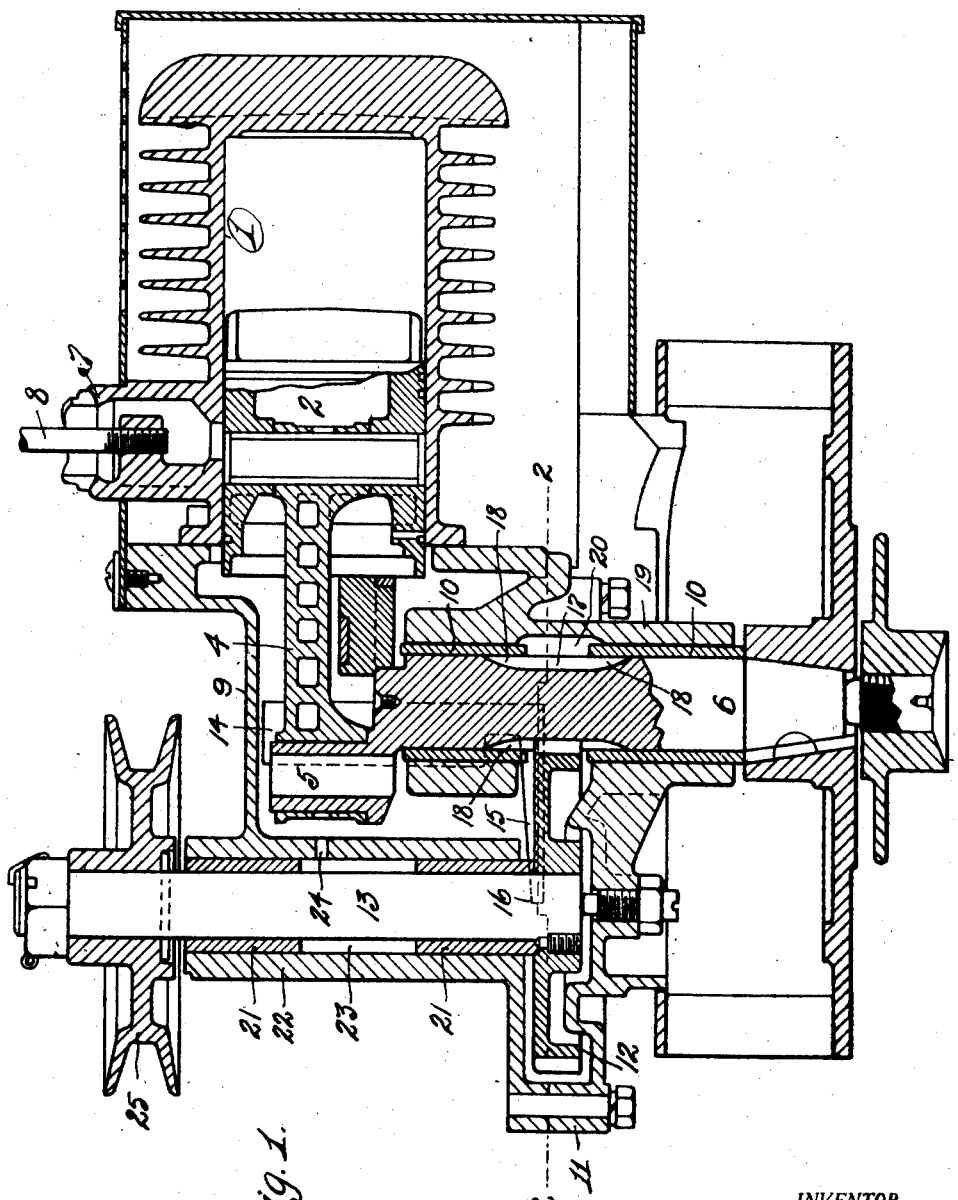
Figure 1 is a horizontal sectional view through a horizontal type of engine showing the lubricating device applied thereto.

Referring to the drawings, the numeral 1 designates an engine of the two-cycle type adapted for operation in a horizontal position and 2 the piston mounted in the cylinder 3, and which piston has connected thereto a connecting rod 4, which connecting rod is connected to the crank 5 of the crank shaft 6. In this type of engine fuel consisting of mixed gasoline, air and lubricating oil coming from the carbureter (not shown) enters the crank case through the pipe 7, as is common in this type of engine. The fuel and lubricating oil mixed therewith enters the crank casing 9 where it is compressed and transferred to the cylinder in the usual manner. The oil being heavier than the vapor, a certain percentage thereof precipitates to the bottom of the crank case 9, and this is facilitated by the rapid rotation of the crank arm 5, and connecting rod movement having the effect of a separator by centrifugal pressure on the charge, causing the heavier oil to impinge and accumulate on the walls of the crank case, and gravitate to the bottom thereof. However it has been found that by this alone, the bearings of the bearing sleeves 10 of the crank shaft 6 are not thoroughly lubricated, and to overcome this difficulty the present device is primarily designed. Disposed to one side of the crank casing 9 is a gear casing 11, and in which gear casing is rotatably mounted an oil distributing gear 12, which is carried by the rotatable shaft 13, disposed in parallel relation to the crank shaft 6. The bottom of the crank casing 9 is provided with an oil collecting trough 14, which trough collects the oil which gravitates to the bottom of the casing 9, and conducts said oil transversely into the angularly disposed portion 15 of the trough, which angularly disposed portion 15 terminates at 16 in the bottom of the gear casing 11 adjacent the bottom of the gear 12, therefore it will be seen that the oil which collects in the crank casing will be discharged in the gear casing where it will be picked up by the lubricant distributing gear 12 during its rapid rotation.

Lubricant distributing gear 12 meshes with the teeth 17 formed integral with the crank shaft 6 and milled thereon, therefore it will be seen that when the crank shaft 6 is rotated at a high rate of speed, the lubricant distributing gear 12 will pick up the lubricant from the gear casing 11 and through its centrifugal action will distribute the lubricant onto the crank shaft 6 between the bearing sleeves 10, and said lubricant will thoroughly lubricate the bearings of the bearing sleeves 10. Sleeves 10 extend over the ends of the teeth 17 carried by the crank shaft, thereby forming pockets 18 between the ends of the teeth and in which pockets lubricant will gather and be held during the rotation of the crank shaft 6, and will slowly seep through the bearings for thoroughly lubricating the same. It will be noted that the bearing sleeves 10 are disposed in a sleeve 19 of the casing 11, and the gear 12 extends through one side of said sleeve, therefore an annular lubricant chamber 20 is formed around the toothed portion of the crank shaft 6, therefore the collection of the lubricant between the bearing sleeves 10 is insured at all times during the rotation of the gear 12.

Shaft 13, on which the gear 12 is mounted, is rotatably mounted in spaced bearing sleeves 21 disposed within the sleeve 22 of the crank shaft casing 9, consequently by having the sleeves 21 spaced an annular lubricant chamber 23 is provided around the shaft 13, and into which chamber lubricant is splashed and forced by the high speed of movement of the crank 5 through the aperture 24 in the sleeve 22, therefore it will be seen that the shaft 13 is thoroughly lubricated at all times. Shaft 13 is provided with a pulley 25, which may be utilized for driving machinery or any other purpose.

From the above it will be seen that means is provided in connection with an internal combustion engine of the high speed type, whereby lubricant which collects in the crank casing will be conveyed through a trough to a distributing gear, which distributing gear takes up the lubricant and distributes the same on the crank shaft adjacent the bearing thereof, thereby thoroughly lubricating the crank shaft at all times. The system is particularly adapted for use in connection with high-speed-two-cycle engines of the horizontal type, however it is to be understood it may be applied to various types of engines.

The invention having been set forth what is claimed as new and useful is:—

1. The combination with an engine crank shaft rotatably mounted in spaced bearing sleeves, a casing having a lubricant collecting chamber therein, a gear rotatably mounted in said casing, a gear carried by said crank shaft and formed by elongated teeth extending into the adjacent ends of the bearing sleeves thereby forming lubricant collecting chambers, said first mentioned gear meshing with the crank shaft gear and forming means whereby lubricant will be conveyed from the lubricant chamber to the crank shaft bearings.

2. The combination with an internal combustion engine having a crank shaft casing, a crank shaft rotatably mounted in said casing in spaced bearings, a gear casing carried by one side of the crank shaft casing, means whereby lubricant from the crank shaft casing will be discharged into the gear casing, a shaft rotatably mounted in the gear casing, a gear carried by said shaft and disposed within the gear casing, a gear carried by the crank shaft between the spaced bearings and meshing with the first mentioned gear, said rotatable shaft being rotatably mounted in spaced bearing sleeves, a sleeve carried by the crank shaft casing and surrounding the spaced bearing sleeve and provided with an aperture in communication with an annular chamber formed by said sleeve, said aperture forming means whereby lubricant will be forced from the crank shaft casing into the annular chamber.

3. The combination with an engine crank shaft casing, a crank shaft rotatably mounted in spaced bearing sleeves, said sleeves being disposed within a cylindrical crank shaft casing thereby forming an annular chamber, a crank disposed in said chamber, of means cooperating with the crank shaft whereby during the rotation of the crank lubricant will be forced through an aperture in the sleeve of the casing into the annular chamber.

4. The combination with an engine having a crank casing, a crank shaft rotatably mounted in said casing, a bearing for said crank shaft, a gear casing, means for draining lubricant collecting in the crank casing to the gear casing, a gear disposed in the gear casing, said gear meshing with a gear carried by the crank shaft through an opening in said bearing, said crank shaft gear overlapping the inner periphery of said bearing adjacent said opening therein.

5. The combination with an engine having a crank casing, a crank shaft rotatably mounted in said casing, a bearing for said crank shaft, a gear carried by said crank shaft spaced from the ends thereof, and a driven gear meshing with the crank shaft gear through an opening in said bearing, whereby lubricant applied to the driven gear will be conveyed by said gear to the crank shaft gear for distribution to the crank shaft bearing.

In testimony whereof we affix our signatures.

PHILIP A. TANNER.
FINN T. IRGENS.